US008202455B2

(12) United States Patent
Nyberg

(10) Patent No.: US 8,202,455 B2
(45) Date of Patent: Jun. 19, 2012

(54) PRESS AND METHOD FOR FORMING A BEAM FROM GLUE-COATED WOOD CHIPS

(75) Inventor: Ulf L. E. Nyberg, Stockholm (SE)

(73) Assignee: Newbeam Sweden AB, Soderhamn (SE)

( * ) Notice: Subject to any disclaimer, the term of this patent is extended or adjusted under 35 U.S.C. 154(b) by 18 days.

(21) Appl. No.: 12/988,842

(22) PCT Filed: Apr. 22, 2009

(86) PCT No.: PCT/SE2009/050414

§ 371 (c)(1),
(2), (4) Date: Nov. 19, 2010

(87) PCT Pub. No.: WO2009/131533

PCT Pub. Date: Oct. 29, 2009

(65) Prior Publication Data

US 2011/0057352 A1 Mar. 10, 2011

(30) Foreign Application Priority Data

Apr. 25, 2008 (SE) ...................................... 0800948

(51) Int. Cl.
*B29C 43/04* (2006.01)

(52) U.S. Cl. ........ 264/109; 425/412; 425/414; 425/416; 425/422; 425/443

(58) Field of Classification Search ........................ None
See application file for complete search history.

(56) References Cited

U.S. PATENT DOCUMENTS 2,821,748 A * 2/1958 Willi ............................... 425/78
6,887,064 B2 * 5/2005 Soh ............................... 425/408

FOREIGN PATENT DOCUMENTS

FR 2312341 A1 12/1976
JP 9239742 A 9/1997
JP 2002187153 A 7/2002
SE 514962 C2 5/2001
WO 01/21369 A1 3/2001

OTHER PUBLICATIONS

International Search Report: PCT/SE2009/050414.

* cited by examiner

*Primary Examiner* — Mary F Theisen

(74) *Attorney, Agent, or Firm* — Ladas & Parry LLP

(57) ABSTRACT

The invention relates to a press for pressing glue-coated wood chips for forming a beam having at least one substantially U-shaped cross-sectional portion. The press comprises a master tool (6), in which an elongate groove with parallel side surfaces is provided, and an elongate forming tool (7) which is vertically displaceable in the groove of the master tool. The side surface of the forming tool (7) and the groove (9) are located at a distance from another for forming a gap (10) between them and comprise each at least one carrier surface (11, 12) which is oriented in the pressing direction of the forming tool, a forming insert (13) which during pressing of the glue-coated wood chips, will move with the carrier surface (11) of the forming tool and contribute to pressing together the wood chips. During retraction of the forming tool, the forming inserts will be obstructed by the carrier surface (12) of the master tool, thereby disengaging the beam from the forming tool. The invention further relates to a method for pressing a beam having a U-shaped cross-sectional portion.

7 Claims, 7 Drawing Sheets

PRESS AND METHOD FOR FORMING A BEAM FROM GLUE-COATED WOOD CHIPS

The present invention relates to a press of the kind used for pressing glue-coated wood chips for forming a beam having at least one substantially U-shaped cross-sectional portion, comprising oppositely arranged lower and upper tools, which each have a plane main surface, which are parallel to and facing each other and which are vertically movable, at least to a limited extent, towards and away from each other, at least one of the upper and lower tools comprising a master tool, which carries the plane, horizontal main surface in which an elongate groove with parallel side surfaces which extend perpendicularly to the main surface is provided, an elongate forming tool with parallel side surfaces, which is vertically displaceable in the groove of the master tool in and opposite to a pressing direction perpendicularly to the plane main surface of the opposite tool, and two horizontally displaceable lateral pressing tools which are arranged between the plane main surfaces of the tools on each side of the groove.

The invention further relates to a method for pressing a beam having at least one U-shaped cross-sectional portion.

BACKGROUND OF THE INVENTION

It is previously known from SE 514 962 to press beams of different cross sections and small material thicknesses from glue-coated wood chips. There are a number of advantages associated with such beams. The beams have, for example, a high strength combined with a slender cross section, which ensures low weight and material consumption. Furthermore, the basic material is cheap, since production is based on the previously known and successful wood composite material OSB (Oriented Strand Board), which is a type of wood chips that can be manufactured from low-priced wood material. In addition, the beams may have various cross-sectional shapes, for example cross-sectional shapes corresponding to those of standard steel beams such as the angle profile, U-profile, I-profile and H-profile.

Very high pressures are used in the production process, normally pressures of approximately 5000 bars. As a result, when pressing beams having a U-shaped cross-sectional portion, for example U-beams, H-beams and, to some extent, I-beams, the beam tend to get stuck to the forming tool that forms the U-shaped cross-sectional portion on the inside. This may cause major interruptions to the production process in continuous industrial manufacturing of such beams.

BRIEF DESCRIPTION OF THE INVENTION

The object of the invention is to improve previously known presses for forming beams having at least one substantially U-shaped cross-sectional portion from glue-coated wood chips that have been pressed together. More specifically, the object of the invention is to provide a press in which the beams are disengaged automatically after the pressing has been completed as the press returns to its initial position. At least this object is achieved by a press for pressing glue-coated wood chips for forming a beam which has at least one substantially U-shaped cross-sectional portion, comprising oppositely arranged lower and upper tools, which each have a plane main surface, which are parallel to and facing each other and which are vertically movable, towards and away from each other, at least one of the upper and lower tools comprising a master tool, which carries the plane, horizontal main surface in which an elongate groove with side surfaces which extend perpendicularly to the main surface is provided, an elongate forming tool with parallel side surfaces, which is vertically displaceable in the groove of the master tool in and opposite to the pressing direction perpendicularly to the plane main surface of the oppositely arranged tool, and two horizontally displaceable lateral pressing tools, which are arranged between the plane main surfaces of the tools on either side of the groove, wherein the side surfaces of the forming tool and the groove [are located at a distance from one another, along at least a part of their cross section, for forming a gap between them and wherein each comprise at least one carrier surface, which is facing in the pressing direction of the forming tool, a forming insert which extends along the whole length of the beam being placed in each gap in the area between the forming tool and the master tool and having a width that is slightly smaller than the width of the gap, so that it substantially fills out the width of the gap but is displaceable, in relation to both the forming tool and the master tool, wherein during pressing of the glue-coated wood chips, the forming inserts will move with the carrier surface of the forming tool and contribute to pressing together the wood chips, and wherein during retraction of the forming tool after the pressing has been completed, the forming inserts will be obstructed by the carrier surface of the master tool, thereby disengaging the beam from the forming tool.

The invention further relates to a method the object of which is essentially the same as that stated above. At least this object is achieved by a method for pressing glue-coated wood chips for forming a beam having at least one U-shaped cross-sectional portion, comprising the steps of providing a press comprising oppositely arranged lower and upper tools, which each have a plane main surface, which are parallel to and facing each other and which are vertically movable, at least to a limited extent, towards and away from each other, at least one of the upper and lower tools comprising a master tool, which carries the plane, horizontal main surface in which an elongate groove with parallel side surfaces which extend perpendicularly to the main surface is provided, an elongate forming tool with parallel side surfaces, which is vertically displaceable in the groove of the master tool in and opposite to a pressing direction perpendicularly to the plane main surface of the opposite tool, and two horizontally displaceable lateral pressing tools, which are arranged between the plane main surfaces of the tools on either side of the groove, the side surfaces of the forming tool and the groove being located at a distance from one another, along a at least a part of their cross section, for forming a gap between them and comprising each at least one carrier surface, which is facing in the pressing direction of the forming tool; placing a forming insert which extends along substantially the whole length of the beam ;n each gap in the area between the forming tool and the master tool, the forming insert having a width that is lightly smaller than the width of the gap, so that it substantially fills out the width of the gap but is displaceable, at least to a limited extent, in relation to both the forming tool and the master tool; pressing a beam with the terming inserts mounted in such a manner that they will move with the carrier surface of the forming tool and contribute to pressing together the mix of wood chips, and retracting the forming tool after the pressing has been completed, wherein the forming inserts will be obstructed by the carrier surface of the master tool, thereby disengaging the beam from the forming tool.

The invention is thus based on the knowledge that the above objects can be achieved by a press comprising at least one master tool, which has a plane, horizontal main surface in which a groove is provided in which a forming tool is vertically displaceable and both the groove and the forming tool have parallel side surfaces, the side surfaces of the groove and the forming tool, along at least a part of the cross section, being located at a distance from one another for forming a gap between them. Each of the side surfaces also comprises at least one carrier surface, which is oriented in the pressing direction of the forming tool, i.e. towards a plane, horizontal main surface of an opposite tool. By placing a forming insert in the gap, which forming insert has a width that is slightly smaller than the width of the gap and a suitable height, the forming inserts, during pressing of the glue-coated wood chips, will move with the carrier surface of the forming tool and contribute to pressing together the mix of wood chips, whereas the forming inserts, during retraction of the forming tool after the pressing has been completed, will be obstructed by the carrier surface of the master tool, thereby disengaging the beam from the forming tool.

Within the scope of this general inventive idea, the invention can be implemented in various ways. In a first embodiment of the invention, as shown and described below, the press comprises a lower master tool, which is designed according to the above, while the upper tool is simply in the form of a plane plate. A press of this kind is intended for use in the forming of beams having a U-profile.

In a second embodiment of the invention, as shown and described below, the press comprises two master tools, which are provided with grooves and forming tools in the manner described above. A press of this kind can be used for forming beams which have two U-shaped cross-sectional portions, such as H-beams and I-beams. In the lower tool the gaps between the side surfaces of the main tool and the forming tool may be completely open, i.e. they may have the same width all the way out to the plane main surface of the master tool, since gravitation will hold the forming insert in place in the gap. This is not possible in the upper master tool, however, since the forming inserts would fall out of the gaps. Hence, the gaps are in this case designed with a section of smaller width in the area closest to the plane main surface of the master tool in such a manner that both the master tool and the forming tool are formed with a stop shoulder facing away from the plane main surface of the master tool. In a corresponding manner, the forming insert is formed with two different cross-sectional widths, on the one hand a first width which is slightly smaller than the width of the gap in the area between the carrier surfaces and the stop surfaces and, on the other hand, a second smaller width which is slightly smaller than the width of the gap in the area between the stop surfaces and the plane main surface and the top surface, respectively. However, there is no need for both the master tool and the forming tool to be provided with stop surfaces, but it is enough if only one of them is provided with a stop surface, as illustrated and described in connection with a third and a fourth embodiment of the invention.

Preferably, both the carrier surfaces and the stop surfaces, as will be illustrated in the following embodiments, are in the form of continuous, elongate shoulders provided in the master tool itself and/or in the forming tool. However, this is not an absolute requirement. The carrier surfaces and the stop surfaces, respectively, could also be arranged, for example, on pins or other protruding members, which could be replaceable and displaceable. It is only the carrier surface of the forming tool that will be subjected to large forces, since the full pressing force will act thereon during pressing of the beams, and hence this surface preferably has the shape of a continuous, elongate shoulder. The carrier surface of the master tool and the stop surfaces are subjected to relatively small forces.

In the production of such beams, it is preferred to use OSB chips, which are specially manufactured for this purpose and which provide high strength beams. It will be understood, however, that other wood fibre materials may be substituted for the OSB chips. The manufacturing concept comprises pressing glue-coated wood chips under high pressure and heat to achieve an initial hardening. For the beam to have a high strength and smooth surfaces all parts of the beam need to be pressed using a press force that is oriented substantially perpendicularly to the beam's surfaces. This means that a U-shaped cross-sectional portion will be pressed at very high pressure against the forming tool that shapes the U-shaped cross-sectional portion and, hence, will tend to get stuck thereto.

In an alternative embodiment of the invention, the cross-sectional height of the flanges of the U-shaped cross-sectional portion may be adjusted by means of forming inserts of different cross-sectional height.

BRIEF DESCRIPTION OF THE ACCOMPANYING DRAWINGS

A number of embodiments of the invention will be described below with reference to the drawings, in which.

DETAILED DESCRIPTION OF EMBODIMENTS OF THE INVENTION

Figure 1:
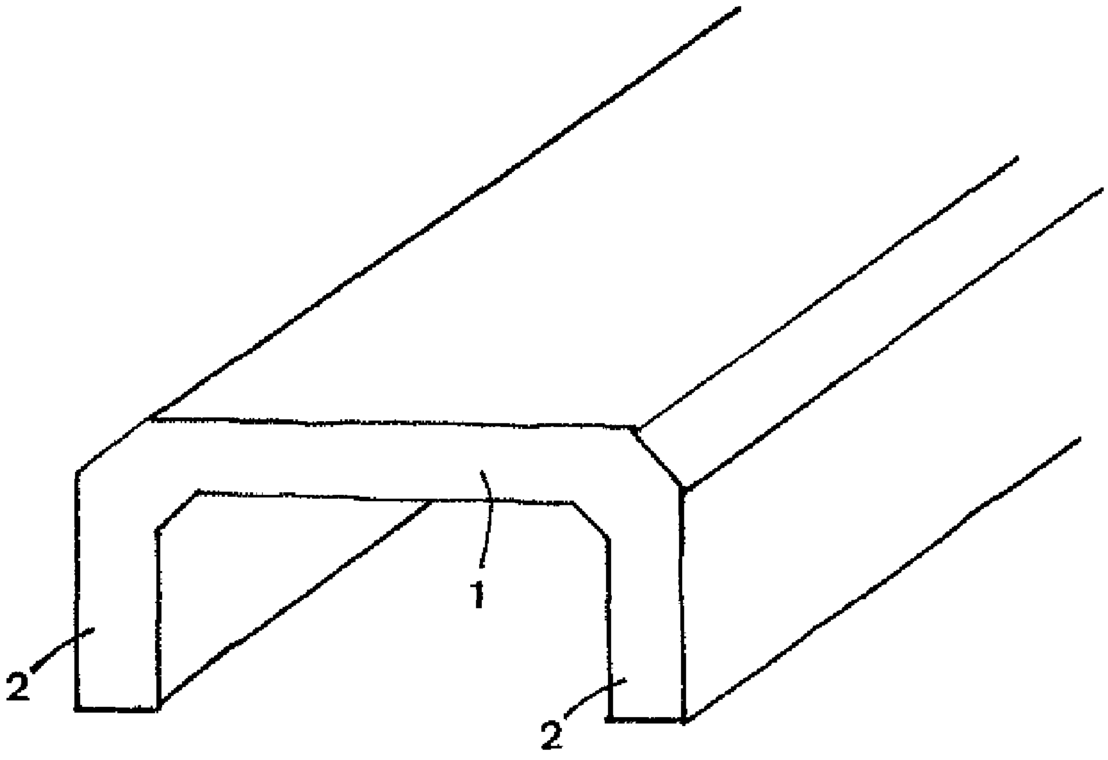
FIG. 1 is a perspective view of a U-shaped beam which can be produced using a press according to the present invention.

Reference is first made to FIG. 1, which shows an example of a beam which can be manufactured by means of a press and a method according to the present invention. As is shown, the beam is substantially U-shaped and has a web portion 1 and two flange portions 2. The illustrated beam is manufactured by pressing together glue-coated wood chips during simultaneous hardening of the glue. The type of wood chips that are preferred for the manufacture of such beams is OSB chips, but also other types of chips and wood fibre materials may be used.

Figure 2:
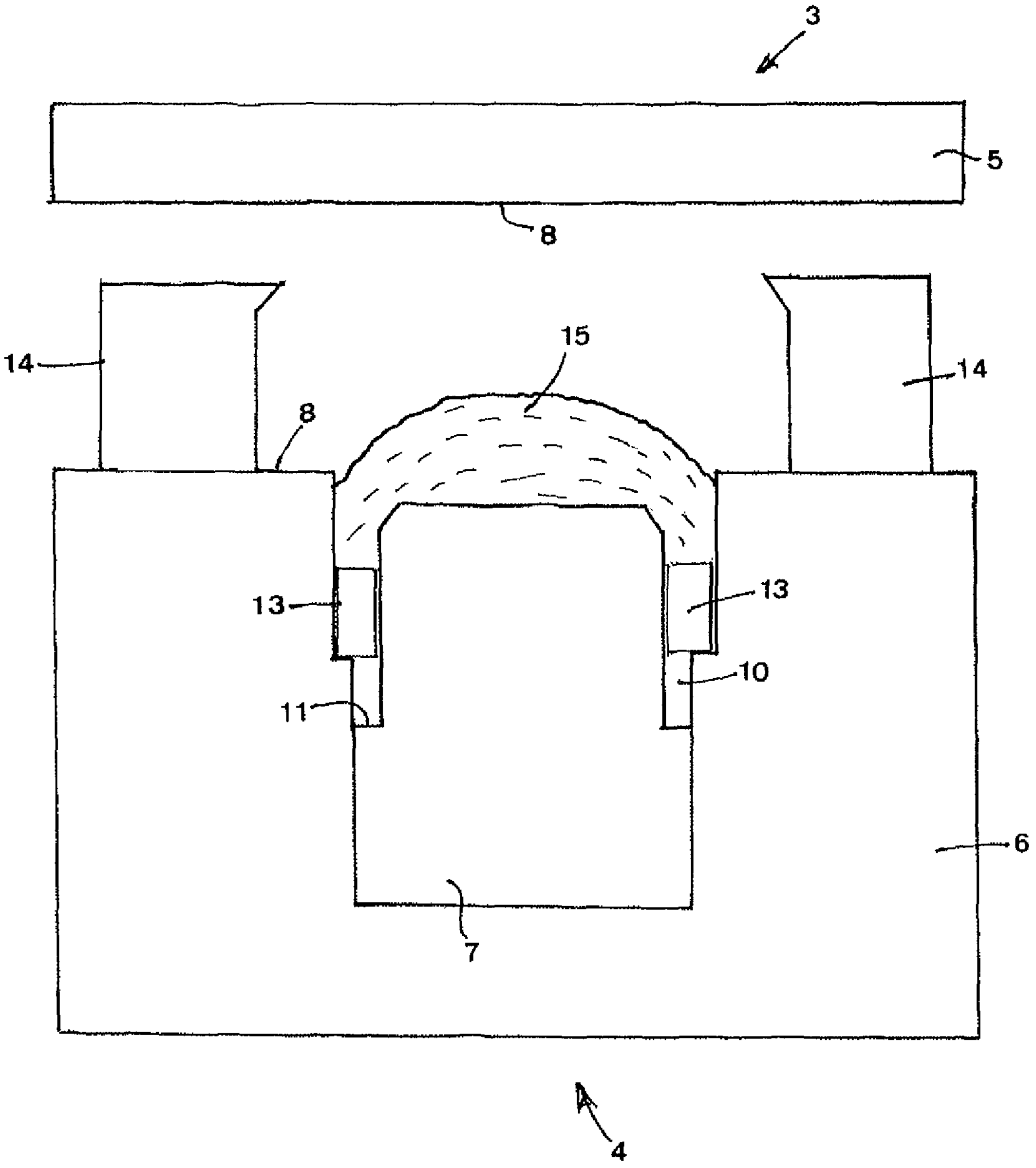
FIG. 2 is a schematic cross section through a press according to a first embodiment of the invention, the press being in an initial position.
Figure 3:
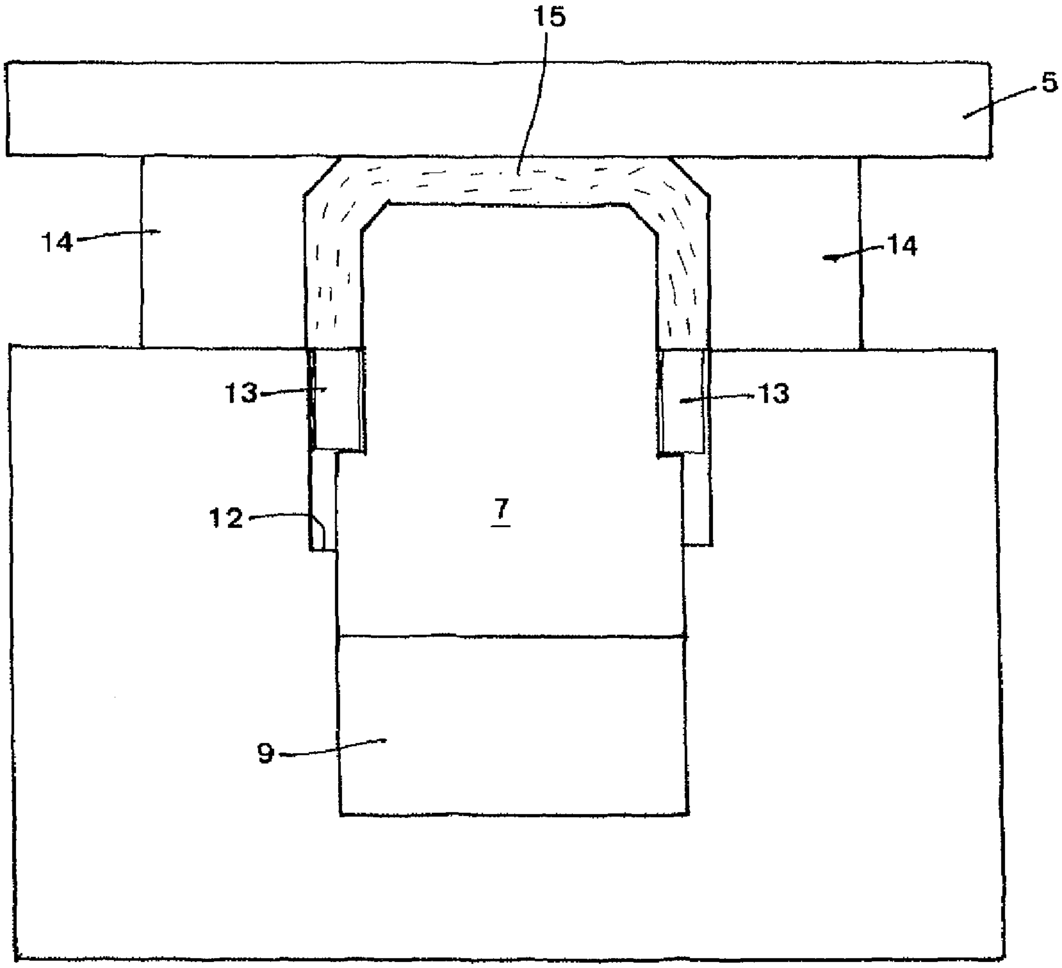
FIG. 3 is a cross section according to FIG. 2 with the press in a pressing position.
Figure 4:
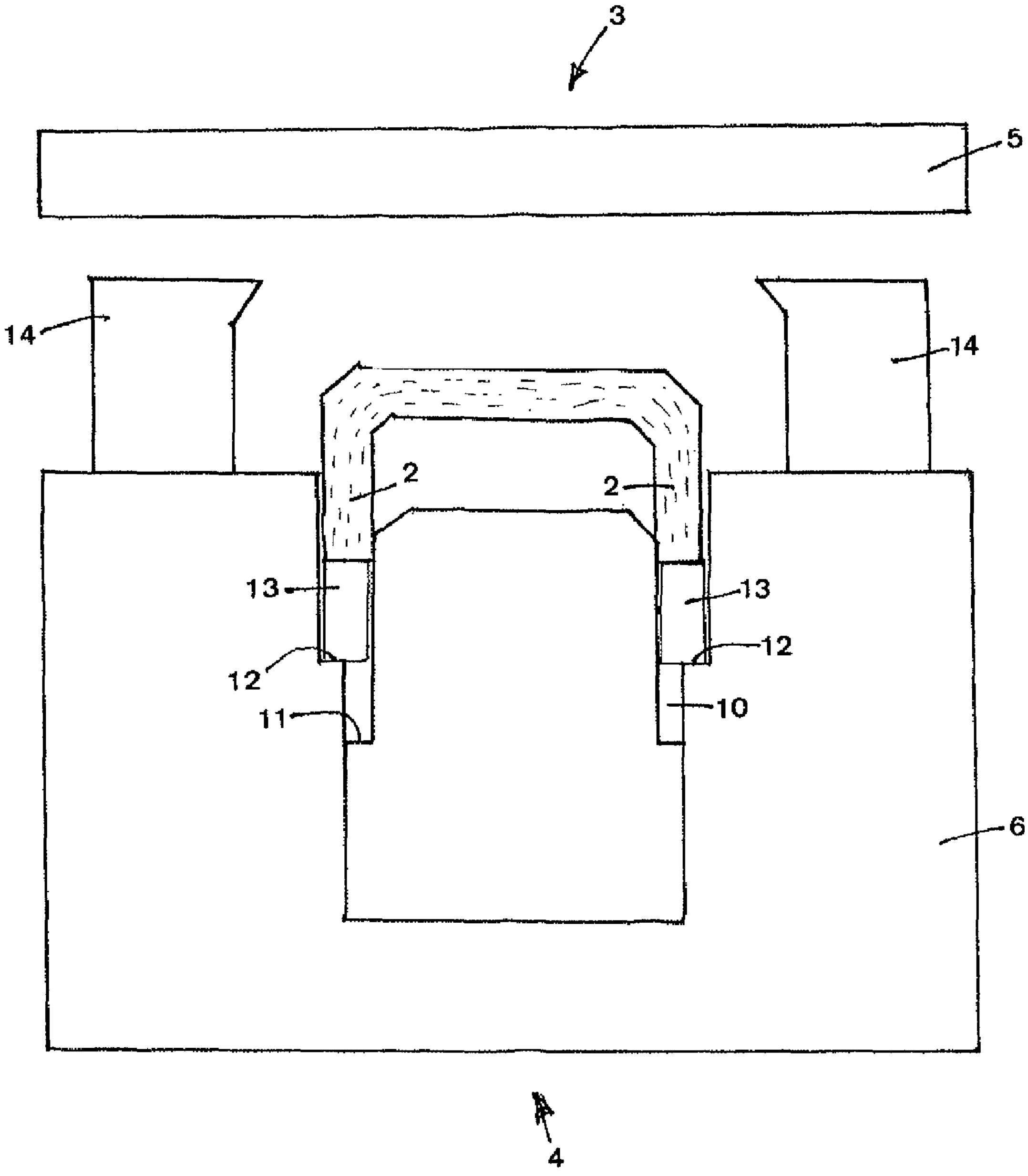
FIG. 4 is a cross section according to FIGS. 2 and 3 with the press in a disengaging position.

Reference is then made to FIGS. 2-4 for a description of a first embodiment of a press for manufacturing a beam having a U-shaped cross-sectional profile. The press comprises an upper tool 3 and a lower tool 4, which are arranged to be movable, at least to a limited extent, towards and away from each other. In this embodiment, the upper tool 3 has the shape of a simple, plane plate 5. The lower tool 4 on the other hand comprises a master tool 6 and a forming tool 7. The master tool 6 has an upper, plane main surface 8 and a recess or groove 9, which is formed in the main surface 8 and in which the forming tool 7 is displaceable by means of force-generating means, such as hydraulic pistons, from an initial position at the bottom of the groove, as shown in FIGS. 2 and 4, and a pushed-out pressing position as shown in FIG. 3. Both the forming tool 7 and the groove 9 of the master tool 6 have in their side surfaces recesses which open onto the main surface 8. In this way a gap 10 is formed between the forming tool and the master tool and a carrier edge 11 and 12, respectively, is formed in the shoulder formed at the end of the respective recess. A forming insert 13 is placed in each of the formed gaps 10. The forming insert 13 has a square cross section whose width is slightly smaller than the total width of the gap between the forming tool and the side surfaces of the groove. On each side of the groove 9 the press also has lateral pressing tools 14, which are movable in a horizontal direction along the main surface 8 of the master tool.

The function of the shown press will be described below, reference being first made to FIG. 2, which shows the press in an initial position in which the upper tool 3 has been moved vertically slightly upwards, the lateral pressing tools 14 have been moved away from the groove 9 and the forming tool 7 has been displaced as far as possible downwards in the groove 9. In this initial position, the forming inserts 13 will abut against the carrier surface 12 provided in the side wall of the groove, the carrier surface 11 of the forming tool being situated below the former. FIG. 2 further illustrates how a heap of glue-coated chips 15 has been disposed in the groove and across the top surface of the forming tool. Suitably, filling of the chips may be effected by means of an elongate trough or the like, which is inserted from the short side of the press. This is typically the easiest way since the press can have a length of about 3 meters or more and the upper and lower tools 3, 4 normally cannot be sufficiently separated, for technical reasons, to allow unobstructed filling from above.

From this initial position the upper plate 5 is lowered until it abuts against the upper sides of the lateral pressing tools 14, which in turn are displaced inwards towards the groove at the same time as the forming tool 7 is displaced upwards. The press is thus in a pressing position, as shown in FIG. 3. During the upward displacement of the forming tool 7 the carrier surfaces 11 of the forming tool will engage the forming inserts 13 and move them upwards, so that their upper surfaces are level with the main surface 8 of the master tool 6. Accordingly, the forming inserts 13 will be actively involved in pressing together the wood chips 15 for forming the U-shaped beam shown in FIG. 3. This means that all the surfaces of the beam will be shaped through the effective pressing of the surfaces of any one of the forming tool, the upper plate 5, the lateral pressing tools 14 and the forming inserts 13. The beam is subjected to pressure for the time required to achieve a sufficient hardening of the glue applied to the wood chips and the hardening may suitably be speeded up by means of some kind of heating in the press, for example by using electricity, hot gas or hot liquid.

After a period of time that is sufficiently long for enabling a satisfactory hardening of the glue, the press returns to its initial position by the upper plate 5 being lifted, the lateral pressing tools 14 being moved outwards and the forming tool 7 being lowered. As a result, the pressing surfaces of the upper plate 5 and the lateral pressing tools 14 will be removed from the beam, thereby disengaging the same. Moreover, when the forming tool 7 is lowered the forming inserts 13 will be obstructed by the carrier surfaces 12 provided in the side surfaces of the groove. This results in the inner surfaces of the U-shaped beam being disengaged from the top surface and side surfaces of the forming tool 7. The only surfaces of the beam that may still be stuck to a pressing surface is the end surfaces of the flanges 2, which may adhere to the upper pressing surfaces of the forming inserts 13. However, the areas of these surfaces, and thus the retention forces, are so small that the beam may easily be removed from the press by displacing it in the longitudinal direction and removing it at one end of the press.

Figure 5:
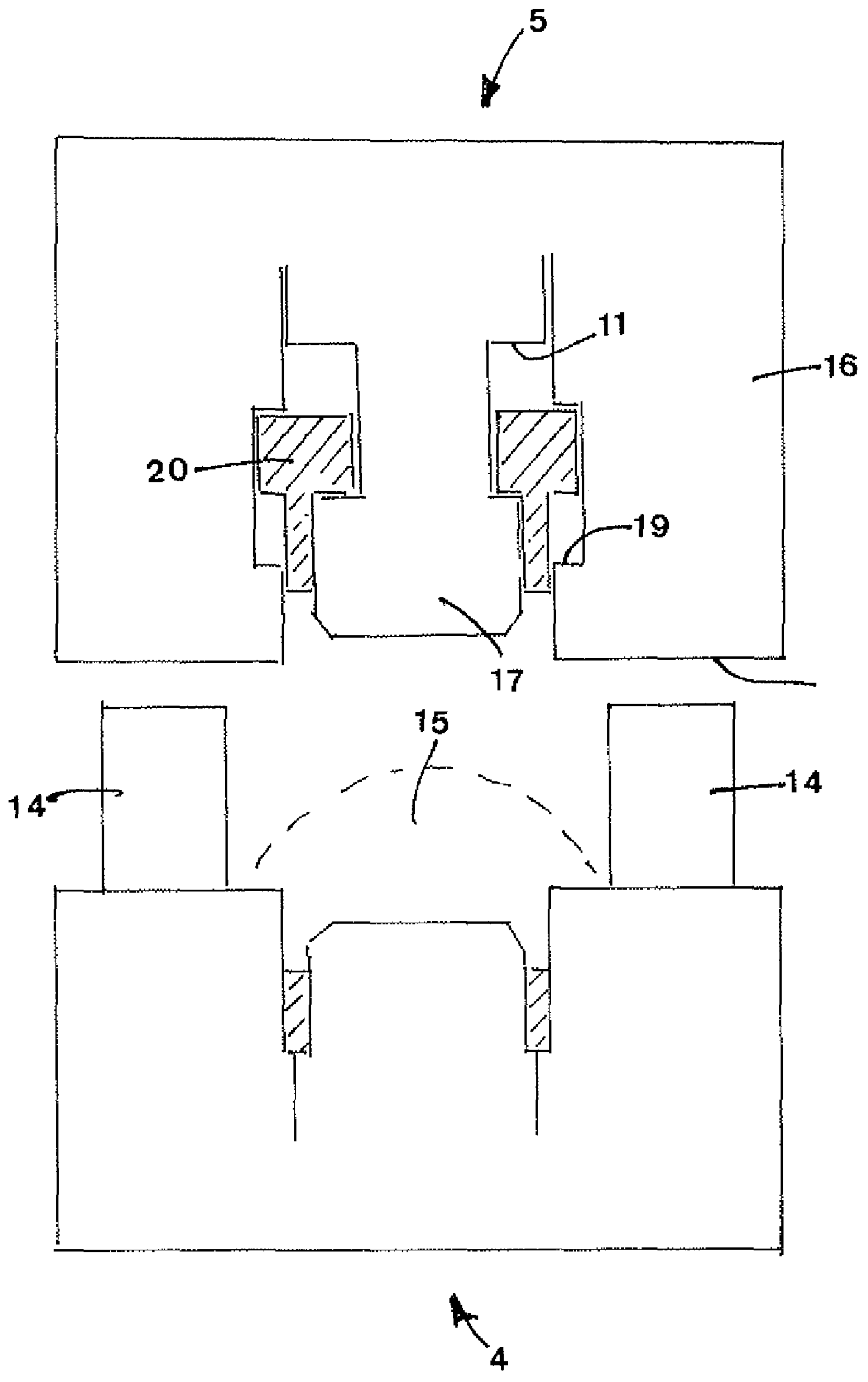
FIG. 5 is a cross section through a press according to a second embodiment in an initial position.
Figure 6:
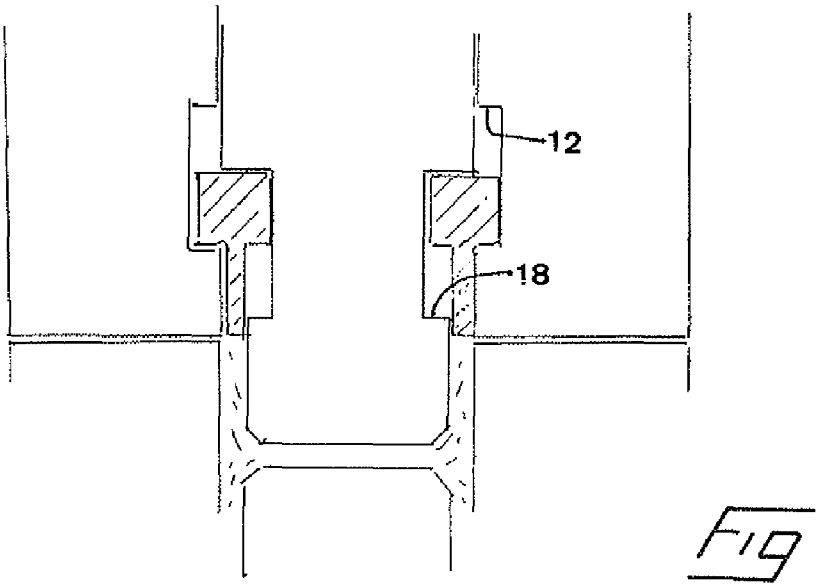
FIG. 6 is a cross section according to FIG. 5 with the press in a pressing position.
Figure 7:
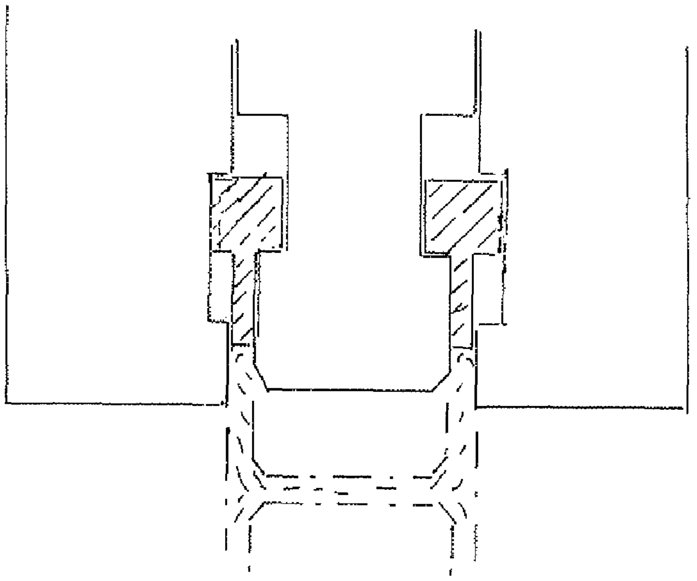
FIG. 7 is a cross section according to FIGS. 5 and 6 with the press in a disengaging position.

Reference is now made to FIGS. 5-7, which illustrate a second embodiment of a press according to the present invention, which press is adapted for pressing of beams having two U-shaped cross-sectional portions, i.e. beams with a substantially H- or I-shaped cross section. To press such beams a lower tool is required which shapes the lower U-shaped cross section on the inside and an upper tool which shapes the upper U-shaped cross section on the inside. After the pressing of such beams has been completed the beam may get stuck to any one of the lower forming tool or the upper forming tool. There is thus a need for a device of the kind described in connection with the embodiment according to FIGS. 2-4, both in the lower tool and in the upper tool. In the case of the upper tool the problem is, however, that the forming inserts will not be retained in the gaps between the forming tool and the master tool by the force of gravity, but will fall out of the gaps if no measures are taken to prevent this.

For this reason, the upper tool 3 is modified, in the embodiment according to FIGS. 5-7, so as to hold the forming inserts in place in the gaps while ensuring the same advantages as those conferred by the embodiment according to FIGS. 2-4. To achieve this the gap between an upper master tool 16 and an upper forming tool 17 is formed with two sections of different width, so that in addition to carrier surfaces 11 and 12 facing the opposite lower tool 4, there is also formed a stop surface 18 on the forming tool and a stop surface 19 on the master tool, which are both facing the respective carrier surface 11, 12. Moreover, the forming insert 20 is formed, in cross section, with an upper section of large width and a lower section of small width. In this way, the forming inserts will abut against one of the stop surfaces 18 or 19, as long as the press is not in a pressing position.

In the following description, the function of the lower tool 4 will be omitted, since it corresponds to that of the previous description in conjunction with FIGS. 2-4. In FIG. 5 the press is in an initial position with the upper tool 3 slightly raised from the lower tool 4, the forming tool 17 retracted in the groove of the master tool 16 and the lateral pressing tools 14 moved away from the grooves of the master tools. In this position, the forming inserts 20 will be carried on the stop surfaces 18 of the forming tool 17. The figure further illustrates how a heap of glue-coated wood chips 15 has been disposed between the lateral pressing tools 14 on the lower tool 4.

In FIG. 6 the press is in a pressing position with the master tool 16 of the upper tool bearing against the upper side of the lateral pressing tools 14, which have been displaced inwards towards the grooves of the master tools and both the lower forming tool 7 and the upper forming tool 17 have been pushed out from the respective master tool, such that their respective top surfaces are located at a small distance from one another. As is shown, the carrier surfaces 11 of the upper forming tool 17 have displaced the forming inserts 20 downwards so that their respective lower surfaces of the lower section are level with the plane main surface 8 of the master tool.

After a required pressing time both forming tools 7, 17 are pulled back into the grooves of the respective master tool. The lower forming tool 7 is then disengaged from the underside of the beam in the previously described manner. Similarly, the upper forming tool 17 will be disengaged from the upper part of the beam by the carrier surfaces 12 of the master tool 16 preventing the retraction of the forming inserts 20, so that the beam is pushed off of the forming tool 17. The beams can then easily be pushed out in the longitudinal direction from one end of the press. It will be understood that a tool according to the upper tool 3 described herein may also be used as a lower tool, if desired.

Figure 8:
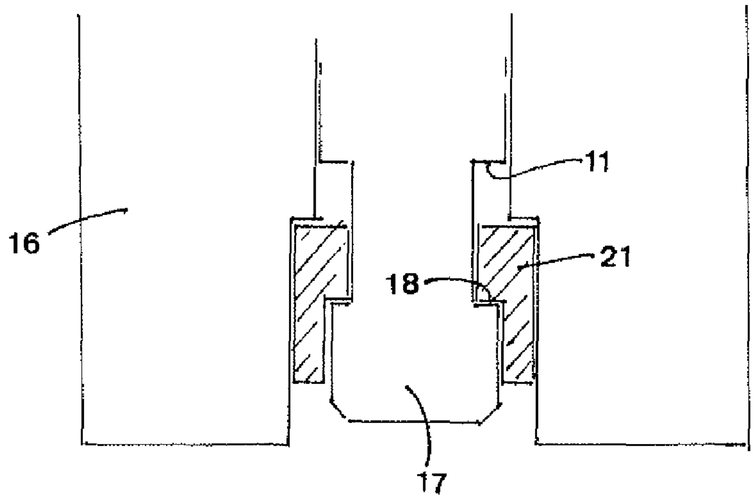
FIG. 8 is a schematic cross section through a third embodiment of an upper tool.
Figure 9:
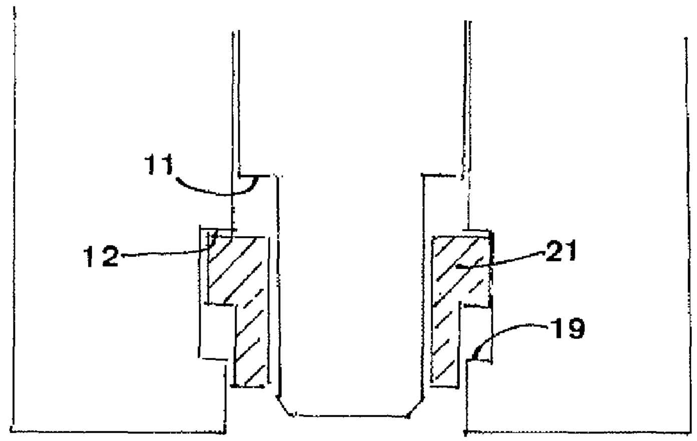
FIG. 9 is a schematic cross section through a fourth embodiment of an upper tool.

FIGS. 8 and 9 show a third and a fourth embodiment, respectively, of the upper tool for enabling compression forming of a U-shaped cross-sectional portion by means of a forming tool 17 and forming inserts 21. In these two embodiments, carrier surfaces 11, 12 are provided on the forming tool 17 and the master tool 16, respectively, whereas stop surfaces are provided on only one of these, namely a stop surface 18 provided on the forming tool in FIG. 8 and a stop surface 19 provided on the master tool in FIG. 9.

The invention claimed is:

1. Press for pressing glue-coated wood chips for forming a beam which has at least one substantially U-shaped cross-sectional portion, comprising:

oppositely arranged lower and upper tools, which each have a plane main surface, which are parallel to and facing each other and which are vertically movable, towards and away from each other, at least one of the upper and lower tools comprising a master tool, which carries the plane, horizontal main surface in which an elongate groove with side surfaces which extend perpendicularly to the main surface is provided, an elongate forming tool with parallel side surfaces, which is vertically displaceable in the groove of the master tool in and opposite to the pressing direction perpendicularly to the plane main surface of the oppositely arranged tool, and two horizontally displaceable lateral pressing tools, which are arranged between the plane main surfaces of the tools on either side of the groove, wherein the side surfaces of the forming tool and the groove [are located at a distance from one another, along at least a part of their cross section, for forming a gap between them and wherein each comprise at least one carrier surface, which is facing in the pressing direction of the forming tool, a forming insert which extends along the whole length of the beam being placed in each gap in the area between the forming tool and the master tool and having a width that is slightly smaller than the width of the gap, so that it substantially fills out the width of the gap but is displaceable, in relation to both the forming tool and the master tool, wherein during pressing of the glue-coated wood chips, the forming inserts will move with the carrier surface of the forming tool and contribute to pressing together the wood chips, and wherein during retraction of the forming tool after the pressing has been completed, the forming inserts will be obstructed by the carrier surface of the master tool, thereby disengaging the beam from the forming tool.

2. A press according to claim 1, wherein the lower tool [comprises a master tool, which is provided with an elongate groove and an elongate forming tool, which is vertically displaceable in the groove, and wherein the upper tool has the shape of a plate.

3. A press according to claim 1, wherein the upper tool comprises a master tool, which has a groove and a forming tool which is movable in the groove.

4. A press according to claim 1, wherein there is a gap in at least the upper master tool and the gap has two sections of two different widths, the section with the smallest width being located closest to the plane main surface of the master tool in such a manner that at least one stop surface facing away from the plane main surface of the opposite master tool is formed in the transition between the two sections of the gap, and that the forming insert has a cross section with two different widths, the larger width being slightly smaller than the larger width of the gap while the smaller width of the forming insert is slightly smaller than the smaller width of the gap.

5. A press according to claim 1, wherein the carrier surface of at least the forming tool is provided on a continuous shoulder.

6. A method for pressing glue-coated wood chips for forming a beam having at least one U-shaped cross-sectional portion, comprising the steps of:

providing a press comprising oppositely arranged lower and upper tools, which each have a plane main surface, which are parallel to and facing each other and which are vertically movable, at least to a limited extent, towards and away from each other, at least one of the upper and lower tools comprising a master tool, which carries the plane, horizontal main surface in which an elongate groove with parallel side surfaces which extend perpendicularly to the main surface is provided, an elongate forming tool with parallel side surfaces, which is vertically displaceable in the groove of the master tool in and opposite to a pressing direction perpendicularly to the plane main surface of the opposite tool, and two horizontally displaceable lateral pressing tools, which are arranged between the plane main surfaces of the tools on either side of the groove, the side surfaces of the forming tool and the groove being located at a distance from one another, along a at least a part of their cross section, for forming a gap between them and comprising each at least one carrier surface, which is facing in the pressing direction of the forming tool; placing a forming insert which extends along substantially the whole length of the beam in each gap in the area between the forming tool and the master tool, the forming insert having a width that is lightly smaller than the width of the gap, so that it substantially fills out the width of the gap but is displaceable, at least to a limited extent, in relation to both the forming tool and the master tool;

pressing a beam with the forming inserts mounted in such a manner that they will move with the carrier surface of the forming tool and contribute to pressing together the mix of wood chips, and retracting the forming tool after the pressing has been completed, wherein the forming inserts will be obstructed by the carrier surface of the master tool, thereby disengaging the beam from the forming tool.

7. The method according to claim 6, further comprising the step of using forming inserts of different cross-sectional height for pressing beams having at least one substantially U-shaped cross-sectional portion with different cross-sectional flange heights.

* * * * *